United States Patent

Faust et al.

[11] Patent Number: 5,411,317
[45] Date of Patent: May 2, 1995

[54] VEHICLE SEAT

[75] Inventors: Eberhard Faust, Stuttgart; Ulrich Maier, Rottenburg; Volker Speck, Sindelfingen; Josef Klink, Nagold, all of Germany

[73] Assignee: Mercedes-Benz AG, Germany

[21] Appl. No.: 182,547

[22] Filed: Jan. 18, 1994

[30] Foreign Application Priority Data

Jan. 16, 1993 [DE] Germany .................. 43 01 054.7

[51] Int. Cl.$^6$ ................................................ A47C 7/02
[52] U.S. Cl. .............................. 297/452.3; 297/452.53
[58] Field of Search ........... 297/452.3, 452.29, 452.32, 297/452.37, 452.53, 284.4, 284.7

[56] References Cited

U.S. PATENT DOCUMENTS

| | | |
|---|---|---|
| 2,459,758 | 1/1949 | Flint . |
| 3,205,009 | 9/1965 | Herider et al. .................. 297/452.53 |
| 3,697,133 | 10/1972 | Wolofski ......................... 297/452.32 |
| 4,283,046 | 8/1981 | Bowles, Jr. ................... 297/452.30 X |
| 4,909,568 | 3/1990 | Dal Monte . |

FOREIGN PATENT DOCUMENTS

| | | |
|---|---|---|
| 0153390 | 1/1989 | European Pat. Off. . |
| 7434028 | 1/1975 | Germany . |
| 3440985 | 5/1986 | Germany .................. 297/452.3 |
| 3643595 | 7/1988 | Germany . |

*Primary Examiner*—Laurie K. Cranmer
*Attorney, Agent, or Firm*—Evenson, McKeown, Edwards & Lenahan

[57] ABSTRACT

A vehicle seat has a sitting surface and a backrest which has a backrest upholstery with a forward upholstery arching arranged in the region of the lumbar vertebrae of the seat user for the purpose of relieving the user's intervertebral discs. For the physiologically most efficient back support for seat users of widely varying body height, without the need to carry out individual adaptation measures on the backrest, the upholstery arching is configured such that its contour vertex is located approximately 250 to 275 mm above the sitting surface and here is itself made so flexible that it easily matches the shape of the back of the seat user, and a relatively rigid pelvic support is formed in the upholstery arching approximately 150 to 175 mm above the sitting surface.

2 Claims, 1 Drawing Sheet

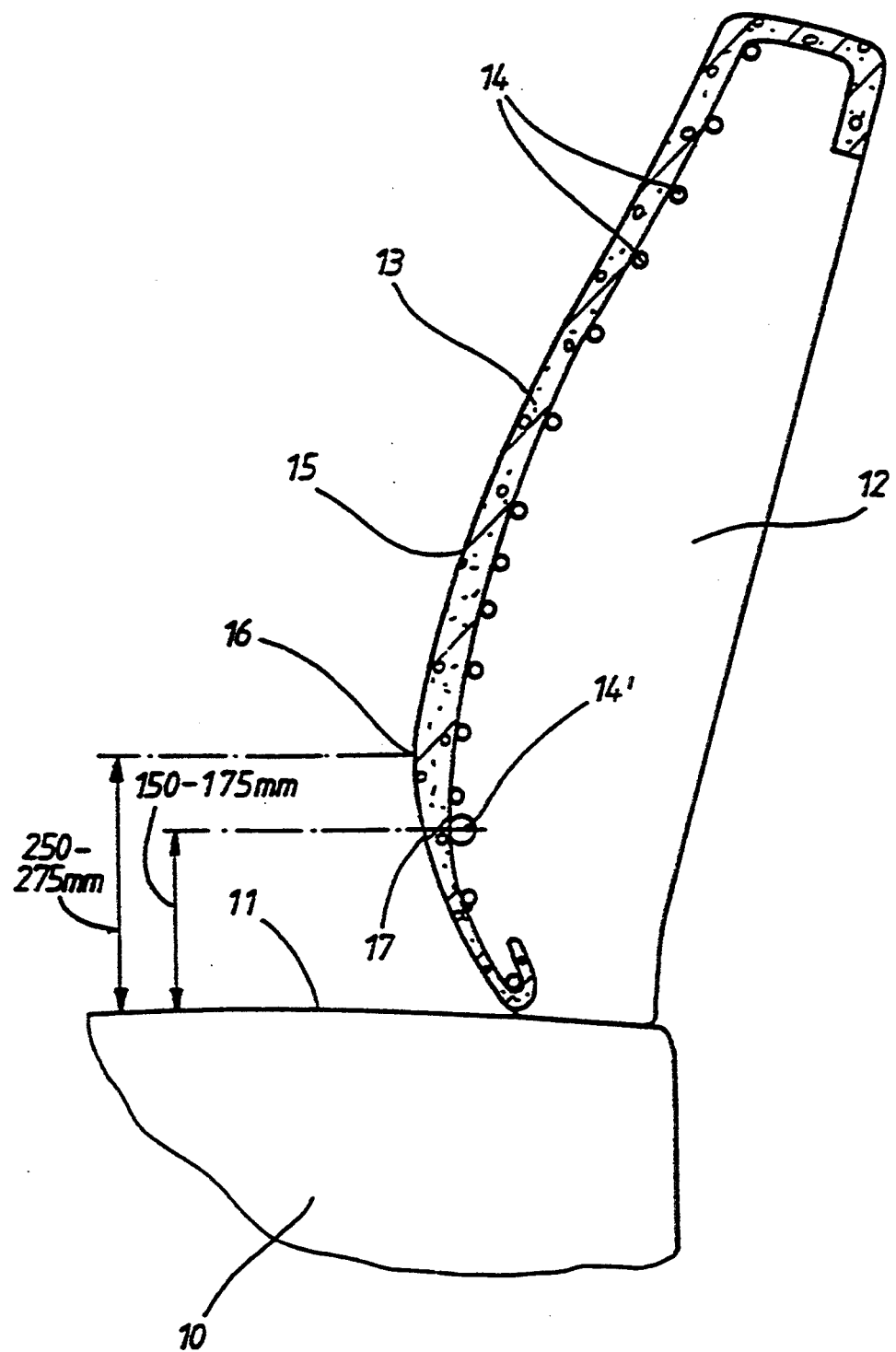

VEHICLE SEAT

BACKGROUND AND SUMMARY OF THE INVENTION

The present invention relates to a vehicle seat having a sitting surface and a backrest, and more particularly, to a seat with a backrest upholstery and a forward upholstery archingly arranged in the region of the lumbar vertebrae of the seat user for the purpose of relieving the intervertebral discs.

The forward upholstery arching in the backrest upholstery of the backrest is to ensure physiological back support (lumbar lordosis), in order largely to prevent the intervertebral disc of the seat user from being subjected to one-sided loads which lead to back complaints and, as a late consequence, often to damage to the intervertebral disc. In view of the widely varying body heights of seat users, such a forward upholstery arching can usually be configured in the most efficient possible way only for seat users of average body height, whereas other seat users of a body height differing from this have to tolerate a greater or lesser impairment of seat comfort.

In order to remedy this deficiency, the known backrest for a motor-vehicle seat shown in German Utility Model 7,434,028 uses a backrest plate covered by the backrest upholstery and installed in the backrest, and a self-locking lordosis support guided on the backrest plate so as to be vertically displaceable and arranged between the backrest upholstery and the backrest plate. The lordosis support is a shaped plastic hollow body which can be adjusted vertically by hand, specifically by gripping with both hands, until the seat user feels to be in the most comfortable possible sitting position and therefore believes that the lordosis support has the best possible setting.

The known backrest described in EP 0,153,390 B1 has an upright supporting frame and a flexible back support fastened to the supporting frame and curved outwards in relation thereto. To obtain a transverse region of rigidity for supporting the back in the upper pelvic area of the seat user, a regulating member extending transversely relative to the back support is arranged between the supporting frame and the back support. The regulating member can, by adjusting apparatus, be displaced vertically in the longitudinal direction of the curve of the back support and be set up, in order thereby to achieve a matching of the contour of the back support to the body height of the seat user and to his form of lordosis.

In both known backrests, the correct matching of the backrest contour to the height of the seat user has to be carried out by the seat user himself. Since there is no marking and measure of any kind for setting the forward upholstery arching so that it is as efficient as possible from an anthropometric point of view, he or she can adapt this only by feel and find the most agreeable forward upholstery arching only after a lengthy use of the seat. Moreover, such adjustment measures involve a high technical outlay and make the seat more expensive, often without affording the expected benefit, since many seat users avoid an individual adaptation of the back support for the sake of convenience. It can also happen that a user having a low lordosis vertex travels with a lordosis arch set very high. This eventually leads to an increased extent to the bad posture, mentioned above, which it is precisely the aim to avoid.

An object of the present invention is to provide a vehicle seat which offers a largely optimized back support for seat users of widely varying body height, specifically without the need for individual adjustment, and which, furthermore, is also inexpensive to produce.

The object has been achieved according to the present invention by configuring the forward upholstery arching such that its contour vertex is located approximately 250 to 275 mm above the sitting surface, the forward upholstery arching is sufficiently flexible in the region of the contour vertex that it easily matches the shape of the back of the seat user, and a relatively rigid pelvic support is formed in the forward upholstery arching approximately 150 to 175 mm above the sitting surface.

The advantage of the vehicle seat according to the present invention is that the backrest supports the spinal column of all seat users from the entire range of statistics on body measurements in the region of the lumbar vertebrae in a sufficiently effective way, without the need for them to carry out any manipulations on the back rest. As regards persons whose body height and therefore back length is in the upper range of statistics on body measurements, the pelvic support according to the present invention supports the upper half of the pelvis in the range between 150 and 175 mm above the sitting surface. In this group of people, the vertex of the forward upholstery arching, located approximately 250 to 275 mm above the sitting surface, is located in the lordosis curvature of the spinal column. The upholstery flexible according to the invention and located in this region fills the lordosis curvature of the seat user, without forcing his or her back into the predetermined upholstery curvature. As regards persons whose body height comes into the lower range of statistics on body measurements, the pelvic support supports both the upper edge of the pelvis and part of the lordosis curvature of the spinal column.. As a result of its flexibility, the vertex of the forward upholstery arching matches the shape of the back of the seat user. Altogether, the vehicle seat according to the present invention guarantees the best possible physiological back support for a large proportion of seat users and an at least sufficiently good back support for the rest.

According to a presently preferred embodiment of the present invention, an especially advantageous version of the relatively rigid pelvic support is achieved in that the backrest upholstery is undersprung over its entire upholstery region and the pelvic support is obtained by means of an undersprining which is clearly less resilient than in the remaining region of the backrest upholstery.

BRIEF DESCRIPTION OF THE DRAWING

These and further objects, features and advantages of the present invention will become more readily apparent from the following detailed description thereof when taken in conjunction with the sole figure which is a schematic.

DETAILED DESCRIPTION OF THE DRAWING

The vehicle seat has a seat cushion 10 with an approximately horizontal sitting surface 11, and a backrest 12 arranged at a preferably adjustable angle of incidence relative to the sitting surface 11. The backrest 12 is provided with a backrest upholstery 13 which stretches over the entire resting surface for the back of the seat user. The backrest upholstery 13 is undersprung over the entire upholstery region, as indicated by individual spring strands 14 in the drawing. The essentially horizontally extending spring strands 14 are held at the ends in the backrest frame (not shown) in a known manner.

The backrest upholstery 13 has a forward upholstery arching 15 in the region of the lumbar vertebrae of the seat user for the purpose of relieving his or her intervertebral discs. For the best possible back support for seat users of widely varying body height and therefore widely varying back length, the forward upholstery arching 15 is configured such that its contour vertex 16 is located approximately 250 to 275 mm above the sitting surface 11. In this region, the forward upholstery arching 15 is made sufficiently flexible that it easily matches the shape of the back of the seat user, without forcing the user's back into a predetermined shape. A relatively rigid pelvic support 17 is formed in the forward upholstery arching 15 approximately 150 to 175 mm above the sitting surface 11. This pelvic support 17 is achieved in that the spring strand or spring strands 14 located in this region and belonging to the underspringing of the backrest upholstery 13 is or are made clearly less resilient than in the remaining region of the backrest upholstery. This more rigid configuration of the spring strands is symbolized in the drawing by a larger diameter of the spring strand 14' in the region of the pelvic support.

If the backrest upholstery 13 has no underspringing, the relatively rigid pelvic support 17 can also be obtained if the backrest upholstery 13 itself is configured in this region with a different thickness or spring characteristic.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A vehicle seat, comprising a sitting surface and a backrest having a backrest upholstery supported by springs with a forward upholstery arching arranged in a region of a seat user's lumbar vertebrae for relieving the seat user's intervertebral discs, wherein forward upholstery arching is configured so that its contour vertex is located approximately 250 to 275 mm above the sitting surface, the forward upholstery arching is sufficiently flexible in the region of the contour vertex that it easily matches the shape of the back of the seat user, and a relatively rigid pelvic support is formed in the forward upholstery arching approximately 150 to 175 mm above the sitting surface.

2. The vehicle seat according to claim 1, wherein the springs supporting the backrest upholstery are provided therebehind over an entire upholstery region thereof, and the pelvic support is obtained by a spring arrangement configured to be clearly less resilient than in a remaining region of the backrest upholstery.

* * * * *